United States Patent [19]
Silfvajt et al.

[11] Patent Number: 5,402,501
[45] Date of Patent: Mar. 28, 1995

[54] AUTOMATED AUDIO MIXER

[75] Inventors: Scott W. Silfvajt, La Honda; Andrew E. Kalmau, Stanford; Robert D. Silfvast; Russell K. Kadota, both of Palo Alto; Adam W. Reif, Mt. View, all of Calif.

[73] Assignee: Euphonix, Inc., Palo Alto, Calif.

[21] Appl. No.: 98,741

[22] Filed: Jul. 27, 1993

Related U.S. Application Data

[63] Continuation of Ser. No. 738,586, Jul. 31, 1991, abandoned.

[51] Int. Cl.⁶ .............................................. H04B 1/00
[52] U.S. Cl. ..................................................... 381/119
[58] Field of Search ......................................... 381/119

[56] References Cited

U.S. PATENT DOCUMENTS

| | | |
|---|---|---|
| 4,479,240 | 10/1984 | McKinley, Jr. ............... 381/119 |
| 4,879,751 | 11/1989 | Franks et al. ................ 381/119 |
| 4,947,440 | 8/1990 | Bateman et al. .............. 381/119 |
| 4,993,073 | 2/1991 | Sparkes ........................ 381/119 |
| 5,027,083 | 6/1991 | Kutzavitch et al. ........... 381/109 |
| 5,060,272 | 10/1991 | Suzuki .......................... 381/119 |
| 5,060,273 | 10/1991 | Olah et al. ................... 381/119 |
| 5,212,733 | 5/1993 | DeVitt et al. ................ 381/119 |

FOREIGN PATENT DOCUMENTS 9113497 9/1991 WIPO .............................. 381/119

OTHER PUBLICATIONS

John W. Richards and Ian (Raven–An Experimental "All Digital" Studio Mixing Desk, Audio Engineering Society, Mar. 1982, pp. 117–126.

Primary Examiner—Forester W. Isen
Attorney, Agent, or Firm—Donald R. Boys

[57] ABSTRACT

A production mix controller for processing and mixing audio signals has a control console separate from an audio mainframe. All audio signals to be mixed are confined to the audio mainframe, and the control console has channels of input devices providing low-voltage input control signals, which are converted to digital signals and stored by a microprocessor-based control system. The control system includes menu selectable functions for setting control modes and routing signals. Digitally controlled analog audio control devices at the audio mainframe are controlled by digital signals retrieved from memory and communicated to the audio mainframe, making the system software controllable. The invention includes functions for block copying arrays of input settings, and facility for storing and retrieving digital snapshots of entire configurations. Input controls are arrayed in channels, and channels are arranged in removable pod modules for modularity.

11 Claims, 15 Drawing Sheets

AUTOMATED AUDIO MIXER

This is a continuation of application Ser. No. 07/738,586, filed Jul. 31, 1991, now abandoned.

FIELD OF THE INVENTION

The present invention is in the area of instruments and systems for managing and mixing audio input for production purposes, such as recordings, and pertains particularly to computer automation of such systems.

BACKGROUND OF THE INVENTION

Audio production for television, video, film, and recorded music sales is a large and growing enterprise, and is the foundation of much of the entertainment industry. Automation in the form of computerization is becoming more and more important as the basis of technical advances in this industry, to provide ability to mix and process more sophisticated and more voluminous audio input, and to provide more flexibility in output. Computerization is also seen as a requirement for cost-effective competition. Manual instruments, systems, and techniques are, by comparison, increasingly more expensive to use.

The basic instrument of audio production is the production mixing console, a workstation presenting an interface to a sound engineer through which he or she may condition multiple channels of audio input, and mix the conditioned results into mono or stereo outputs for direct broadcast or for recording. A production mixing console, hereinafter a mixer, typically presents arrays of input devices, such as switches, knobs, and "faders", for an operator to set to condition and route audio signals. A fader is typically a slide rheostat through which an amplitude may be adjusted as a result of the linear position of the input lever relative to a track.

Mixers typically route audio input signals to individual channels, and each such channel has a repetitive layout of switches, knobs, and faders. For example, a single channel can have more than one input, such as a microphone input and an input from an instrument, a group of instruments, or a tape. Using the controls on a mixer an engineer can select microphone, line, and tape inputs, route the inputs to signal conditioning devices like faders and equalizers, and mix and route the output from the conditioning devices as well. There is typically a selective ability to monitor audio signals, such as by headphones, and often a microphone for talkback by the sound engineer operating the console.

Audio mixing, especially with digital techniques and computer control, is historically a rather recent development. When rock-and-roll music was first introduced there was no such device as a mixer. In the fifties, recording was done by direct input. Modern mixing was initiated about the time of the appearance of the Beatles, and the first units were highly individualistic. Through the sixties and early seventies direct audio mixers continued to be developed, and continued to be relatively small units with a few channels and were very unique in layout. In the mid-seventies standards began to appear, especially relative to layout of switches, rotary potentiometers, and faders. With a standard layout it became possible for a sound engineer to go from one studio to another, and take over the functions comfortably.

In the early development and well into the late seventies, mixers were completely manual. The audio signals were routed to the mixer, and directly through the switches, pots, and faders. As a result, there were some definite limitations and problems. For example, with the audio signals routed directly through the switching and signal processing devices, it was necessary that heavy duty, low noise devices be developed. Without ultra-high quality devices, contacts, rheostat slides, and the like produce unwanted clicks and other noises that are incorporated into the audio signals.

Another difficulty is that the devices have to be used a great deal. During production sessions an engineer is constantly making changes in settings of many devices, and, just like any other expensive equipment, the mixer has to be used a great deal to justify its cost. Still another problem is that with audio signals routed through the console, especially in the event of many channels in use for multiple inputs, there is a lot of opportunity for cross-talk, meaning mixing of signals not meant to be mixed.

In addition to the problems described above, there are also particular limitations relative to manual consoles. One is simply size. As the number of inputs increases, the necessity for additional channels also increases, and the size of the console layout increases as well. Consoles quickly become unwieldy, and an engineer has to move up and down a wide console to make adjustments.

Yet another limitation is that manual settings have to be made for every session, and adjusted. It is quite difficult to duplicate favorite settings. An engineer using a manual console must make notes and diagrams of preferred settings, and adjust manual controls to suit. Even when settings are recorded, it is very difficult to reproduce them exactly on a single console, much less on a different console. With a manual console, sound engineering is very much an art and very little a science.

In the 1980's automation began to appear in professional recording studios. The first efforts were patchwork devices for automating manual console functions, and even today many automated consoles are analog audio consoles with digital equipment adapted to existing devices. Part of the reason for this is the expense of analog audio equipment, and the natural reluctance of manufacturers to Scrap usable and saleable devices in favor of complete new designs. So there has been a tendency to automate in an incremental fashion, leaving some functions manual, and in almost all cases, continuing to route audio signals through the console.

What is needed is a console designed to separate the audio from the control console, with all controlled audio routed and processed in a completely separate area. Such a system needs to be computer controlled and software based, "remembering" device settings for future use, and taking advantage of digital processing techniques, such as displaying equalizer curves and allowing software set up and configuration.

SUMMARY OF THE INVENTION

A mix controller is provided by the present invention for processing and mixing audio signals, including an audio mainframe for receiving, processing and mixing, and outputting the audio signals through digitally controllable analog audio control devices contained in the audio mainframe. There is a console for inputting analog electric control signals and for displaying control status and signal characteristics, including signal routing. The invention also includes a microprocessor-based control system coupled to the console for receiving the analog electric control signals, converting them to digital data, storing and retrieving the data, and for controlling the transfer of the data between the console and the audio mainframe. In addition there is a data communication sub-system connecting the audio mainframe and the console for carrying the digital data. The digitally controllable analog audio control devices in the audio mainframe respond to the data converted to digital form from the analog electric control signals.

Manually settable analog electric input devices and lightable displays for displaying control status and signal characteristics are grouped on the control console in control blocks with each control block corresponding to one of the digitally controllable analog audio control devices in the audio mainframe. Control blocks are arranged in channel arrays, and channel arrays are grouped into removable pod modules, with each pod module having a microprocessor for control function and a RAM memory unit for storing digital data. There are additionally bar graph meters on the console for displaying data.

In the preferred embodiment each removable pod module connects by a separate digital communication cable to a control module in the audio mainframe, with each control block on the pod module corresponding to one of the digitally controllable analog audio control modules.

A method is provided in the invention for calling attention to a control block by pressing a block attention key at the control block, selecting control functions from the menu, entering data to control routing and set control modes, and displaying settings at displays at the control block. Another method is provided for copying control block settings from one control block to another, and yet another for storing and recalling complete console configurations.

The invention provides a unique mixer console with an absolute minimum of crosstalk or noise contributed by control devices. Also, the use of low voltage analog electric input devices coupled with conversion to digital control signals tends to maximize reliability and durability while minimizing cost. Multiple input modules each with a control microprocessor provides for off line repair and maximum up time for the mixer system. The conversion of input signals to digital form and storing the digital equivalents in RAM memory makes the system software controllable.

EMBODIMENTS

General Description

Figure 1:
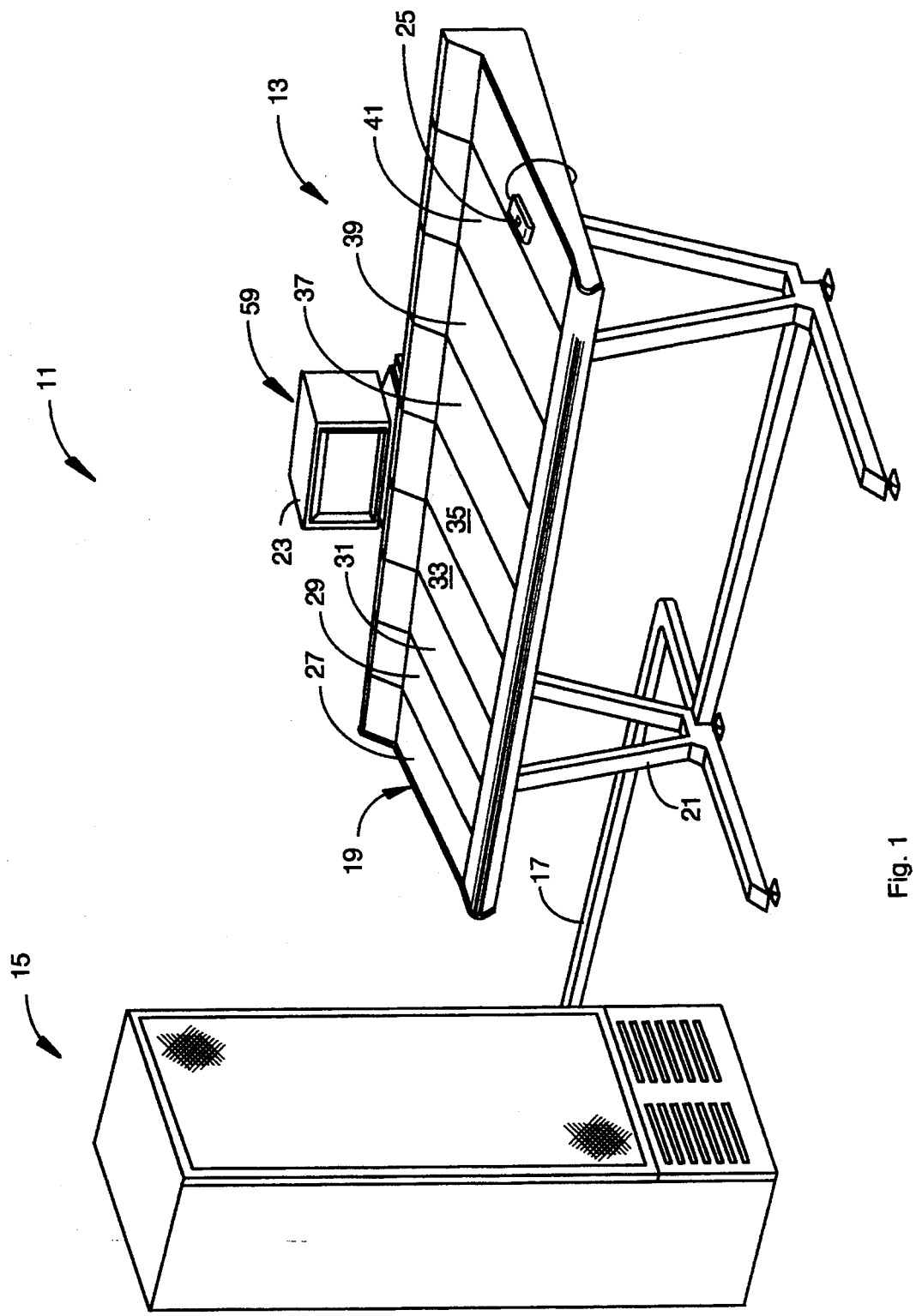
FIG. 1 is a perspective view of a mixing system according to a preferred embodiment of the invention.

FIG. 1 is a perspective view of a mixing system 11 according to a preferred embodiment of the invention, called the Crescendo System by the inventors, wherein the essential functions are strictly separated into a control mainframe 13 and an audio mainframe 15. In this embodiment, and in other embodiments of the invention, control mainframe 13 comprises control hardware and computer components. There are no audio signals fed to, processed by, or routed from the control mainframe, other than talkback and headphone systems required for control communication. All audio signals to be processed and mixed go to, are processed by, and are output from audio mainframe 15. Processing and routing in the audio mainframe is done by digitally controlled analog devices. This strict separation allows audio to be located away from the control functions, in the preferred embodiment as far as 25 meters away, so the audio mainframe may be located even in a separate room from the control mainframe.

Communication between control mainframe 13 and the audio mainframe is digital in nature, arid via cables carried in signal pathway 17. Many other layouts for connection between the control mainframe and the audio mainframe are suitable, such as under the floor, overhead, and so forth.

In the embodiment shown in FIG. 1 control mainframe 13 comprises a control console 19 carried on a support frame 21; computer elements not shown in FIG. 1; a computer monitor 23 which is a part of an 80386-based PC 59; and a "mouse" computer input device 25 as known in the art. Console 19 has eight removable I/O control modules 27, 29, 31, 33, 35, 37, 39, and 41 in the preferred embodiment. There can be fewer or more in other embodiments. The removable modules are called pods. Each pod except pod 35 comprises 4 I/O control channels, analogous to I/O channels in a conventional console. Pod 35 is a Master Module comprising a Master Section and a Command Section. Many other pod configurations on the console control surface are possible. For example, a user can place the Master Module in any one of the pod bays.

The master section comprises monitor controls, master auxiliary sends, two stereo output faders, and other master control input devices described below relative to FIG. 5A through FIG. 5D. The command section comprises interface devices for configuration, routing, and automation, such as a data entry wheel and an alphanumeric display.

System Hardware Organization and Communication

Figure 2:
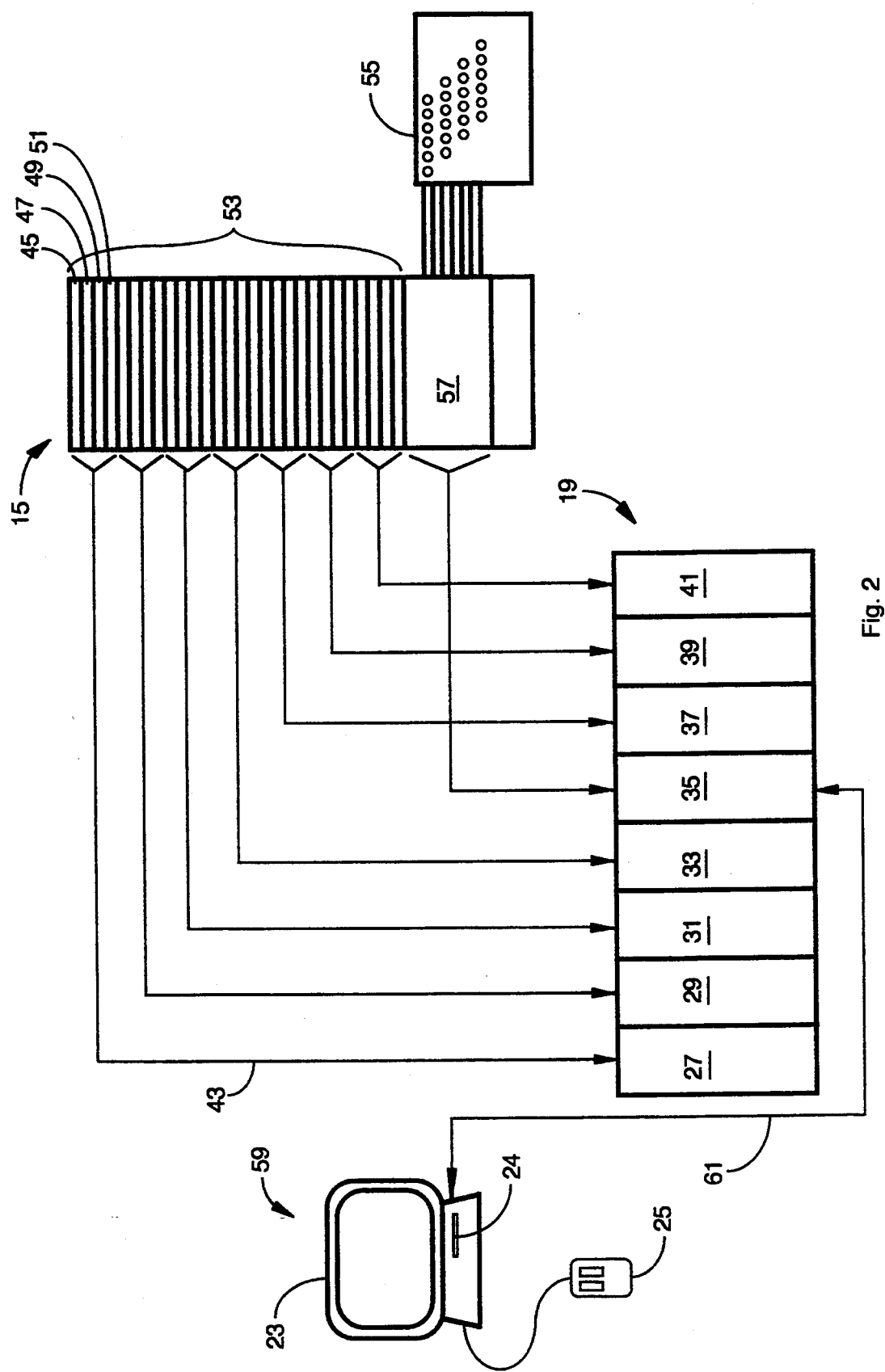
FIG. 2 is a block diagram of the system of the preferred embodiment to illustrate the physical architecture of the system.

FIG. 2 is a block diagram showing the physical and signal architecture of the Crescendo system in the preferred embodiment. Each of the several pods in console 19 is connected via a separate control cable assembly to a group of four electronic modules in the audio mainframe. Each of the electronic modules in the audio mainframe is an assembly of digitally controllable components for managing audio signals, with the components typically implemented as plug-in printed circuit boards. Also, each of the four electronic modules in each group is associated with a single channel in the connected digital control module in the console. For example, pod 27 is connected to the audio mainframe via cable assembly 43, and at the audio mainframe there are four electronic modules 45, 47, 49, and 51, each associated with 1 control channel in pod 27. Portion 53 of the audio mainframe has 7 groups of four electronics modules in the preferred embodiment, each group coupled by a separate cable to a pod module at the console. There are more or fewer in other embodiments that have more or fewer pods in the console.

The use of separate cables for each of the pod modules of the console provides redundancy for the communication link. In the event of damage to a single cable carrying all of the digital signals between the console and the audio mainframe, the entire console function would be interrupted. In the case of separate cables, only the modules connected to a damaged cable would be affected, and the balance of functions would still be useable.

The communication link between the pods and the audio mainframe is based on a high-speed serial protocol operating at about 2 megabits per second, to assure immediate response of audio control circuits in the mainframe to changes commanded at the console. Also in the preferred embodiment all of the cable connections carrying digital code to and from the audio mainframe are optically isolated at the mainframe to provide complete electrical separation of the control functions from the audio (analog) sections. Master control pod 35 is similarly coupled by a high speed serial link to master section 57 in the audio mainframe.

A patch bay 55 separate from the audio mainframe provides plug connections for all inputs and outputs, and provides an assignment facility for all audio signals. An engineer plugs mike and line inputs into any channel at the patch bay, and takes off outputs from any channel, as well as mono and stereo output buses and other outputs from the mainframe. The patch bay is connected to the audio mainframe via multipair audio cables, with both ends terminating in Elco connectors. Every physical input and output terminates in a plug at the patch bay.

In the preferred embodiment IBM-compatible 80386-based PC 59, including monitor 23 and floppy-disk drive 24, is coupled to the master control pod via an RS-232 communication link 61 operating at about 38.4 Kbaud, and provides additional programming capability through unique software called the MixView graphic interface. The Crescendo system is fully functional without the PC interface, but the computer adds additional control dimensions and non-volatile storage capacity.

An I/O Channel

Figure 3:
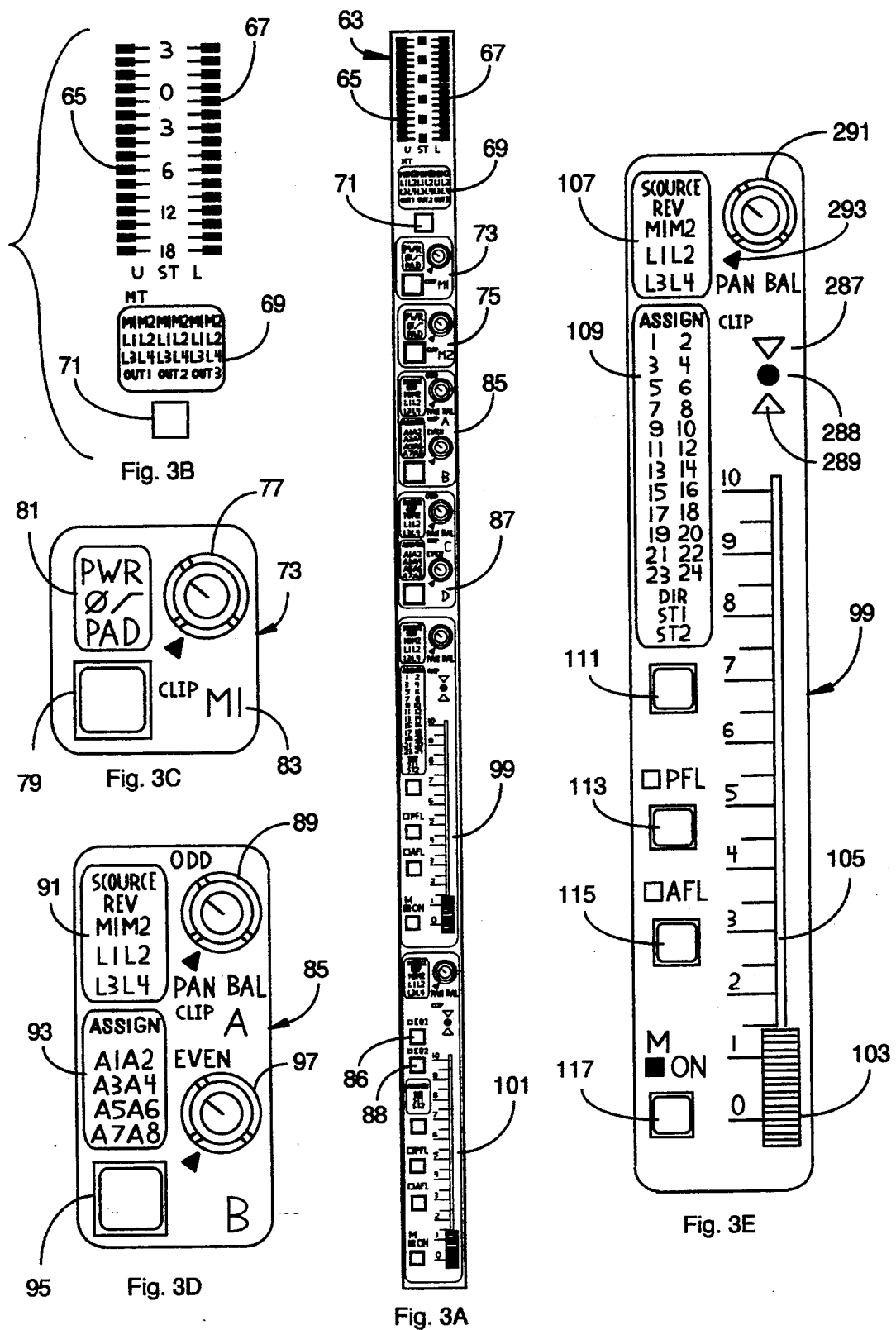
FIG. 3A is a plan view of input devices arranged in a single input-output channel.
FIG. 3B is an enlargement of a digital bargraph meter from FIG. 3A.
FIG. 3C is an enlargement of input controls for a programmable gain amplifier from FIG. 3A.
FIG. 3D is an enlargement of control inputs from FIG. 3A for a pair of auxiliary sends.
FIG. 3E is an enlargement of a fader from FIG. 3A.

A conventional mixer I/O channel typically has 1 mike input, 1 line/tape input, 1 long throw mono fader, 1 short throw mono fader, 1 EQ section, 4 to 6 mono aux sends, 4 to 8 aux buses, 1 mono direct output, 1 effects loop, and group output trim control. These components are typical, and vary somewhat from manufacturer to manufacturer. An I/O channel for the mixer in the preferred embodiment has 2 mike inputs, 4 line/tape inputs, 2 long throw stereo or mono faders, 2 EQ sections, 4 mono/2 stereo aux sends, 8 aux buses, 1 mono/stereo direct output, 3 effects loops using line inputs, and group/submix output trim. FIG. 3A is a detailed layout of input devices and meters for a single I/O channel 63 in the preferred embodiment, with specific groups of elements magnified to show additional detail.

Beginning at the top of the single channel, there are two software-driven bargraph meters 65 and 67. These are assignable to display amplitudes of virtually any signal or signal mix including channel inputs, channel outputs, multitrack buses, or automated fader movements. The dynamic range of the meters is adjustable for precise calibration or headroom monitoring while showing either peak or VU characteristics. FIG. 3B shows the meters and associated features in more detail. The meters are assignable through the command section, and are driven by digital signals delivered to the channel from the audio mainframe via the same high-speed serial link that delivers input settings to the audio mainframe.

Block 69 is a display to indicate the assignment for each of three Insert Sends called Out 1, Out 2, and Out 3. These are prefader, post EQ outputs. The channel sources are assignable at each insert send, immediately after the EQ. These outputs are typically used as insert points for sending a pre-fader signal to a dynamic controller, such as a compressor/limiter, then back to the channels line inputs. Button 71 is a block attention key used in the assignment process for the Insert Sends.

The meters are outputs and do not include variable input devices. Each control block of input devices in an input channel is associated with a specific signal processing device in the audio mainframe, and each control block has a block attention key as well, to enable the block for assignment at the master control section described below.

Each I/O channel has control blocks 73 and 75 for two ultra-low-noise universal input amplifiers in the audio mainframe. Block 73 is shown in additional detail in FIG. 3C. The amps can be assigned to mike or line level sources. The level controls can be software linked if desired to adjust the gain of a stereo source. Other software settable features include phantom power, phase reverse, and a 100 Hz hi-pass filter. A pad function is automatic. Four line inputs are also included to serve as effect returns or insert points. Knob 77 (FIG. 3C) is for setting the gain. Key 79 is the block attention key to enable the amplifier control block for set-up at the Command Module, which is described below. Display 81 is for displaying configuration characteristics: phantom power, pad, phase reverse, and the use of the 100 Hz hi-pass filter. Hidden-til-lit display 83 is for indicating the routing assignment of the amplifier. In this case, the amp is assigned to microphone 1 (M1) alone.

There are four auxiliary sends associated with each I/O channel, with controls arranged in two control blocks. Block 85 is for sends A and B, and block 87 for sends C and D. Block 85 is shown in additional detail in FIG. 3D. The sends are assignable to 8 auxiliary buses. These sends are for cue mixing or effects processing. Key 95 is a block attention key for enabling the send block for configuration at the Command Section. Knobs 89 and 97 are gain controls. Display 91 shows input selections and display 93 shows output assignments.

There are two four-band programmable parametric equalizers associated with each I/O channel. The equalizers can be linked together for stereo or used separately with two mono sources. With a PC monitor coupled to the command section and the MixView software active, graphic display of EQ response curves make adjustment simple and intuitive. Favorite settings can be stored and recalled for re-use through the command section. Keys 86 and 88 at the lower fader control block are block attention keys for the EQs, and are labeled EQ1 and EQ2 respectively.

Each I/O channel has two faders 99 and 101 that are alike except for assignment flexibility. Fader 99 is shown in additional detail in FIG. 3E. Fader setting lever 103 can be set at any point along 100 mm track 105, and the track is annotated with a linear 0 through 10 scale. Block 107 indicates source assigned and block 109 indicates output assignment. Button 111 is the block attention key for the fader.

Upper fader 99 can operate in either a mono or a stereo mode and its output can be assigned to either of two stereo or any of 24 tape buses, or to two separate direct outputs. Its source or its output can be soloed using PFL (pre fader listen) key 113, or AFL (after fader listen) key 115. On either fader, ON key 117 is used to add (or remove) the fader's output from its assigned mix buses.

Lower fader 101 can be used to create a monitor mix during tracking or used as a full-function fader during mixdown. The output of the lower fader is not assignable to the tape buses. Any combination of faders can be software linked, allowing an infinite number of grouping possibilities.

Console Modularity

Figure 4:
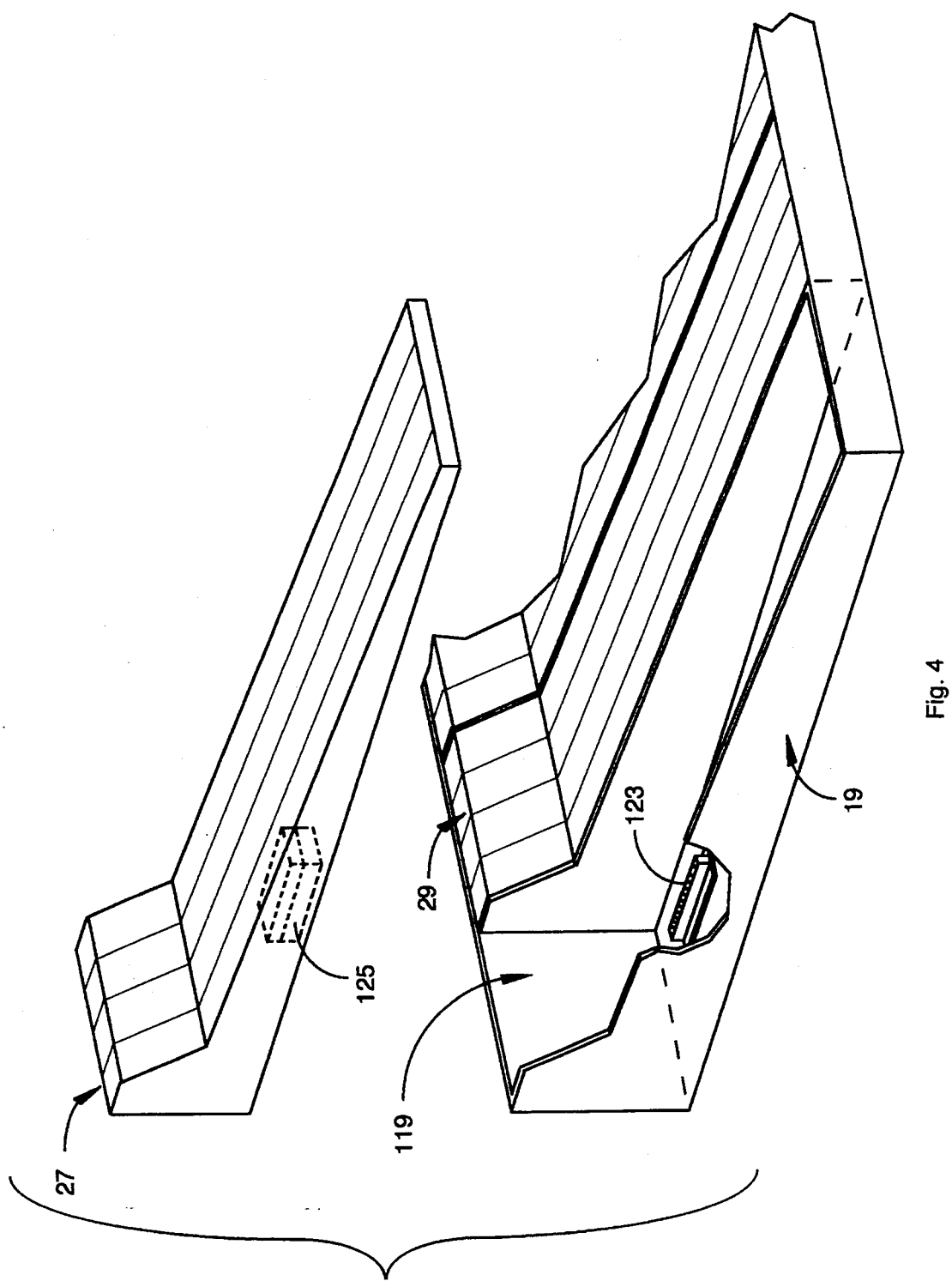
FIG. 4 shows a pod module removed from a pod bay in the preferred embodiment.

Each pod module 27, 29, 31, 33, 37, 39, and 41 (FIG. 2) comprises four I/O channels of the architecture shown by FIGS. 3A, B, C, D, and E. FIG. 4 shows a pod module 27 removed from pod bay 119 in console 19. A pod module is removed by first lifting top rear panel 121 FIG. 2), which exposes the rear of the pod modules. Every module has a handle for lifting it from the pod bay, which isn't shown in FIG. 4. One simply grasps the handle and lifts upward. Electrical connection is via a connector with a portion 123 attached to the bay, and a mating portion 125 mounted under the pod module. The pod module fits in the bay closely enough that the connector mates when the module is seated in the bay.

Connector portion 123 is coupled to a printed circuit board (not shown) which provides electrical bus to another connector to mate to one end of the cable group that runs to the audio mainframe for that particular pod module.

The use of a separate cable for each module to the audio mainframe and the ease with which a module may be removed and replaced provides maximum redundancy and flexibility. Loss of a single cable disables only a single I/O module. Moreover, removability provides maintenance and troubleshooting advantages. Keeping a single spare module allows a user to switch out a malfunctioning module, keep the console operating, and perform tests and repair off line.

The Master Module

Figure 5A:
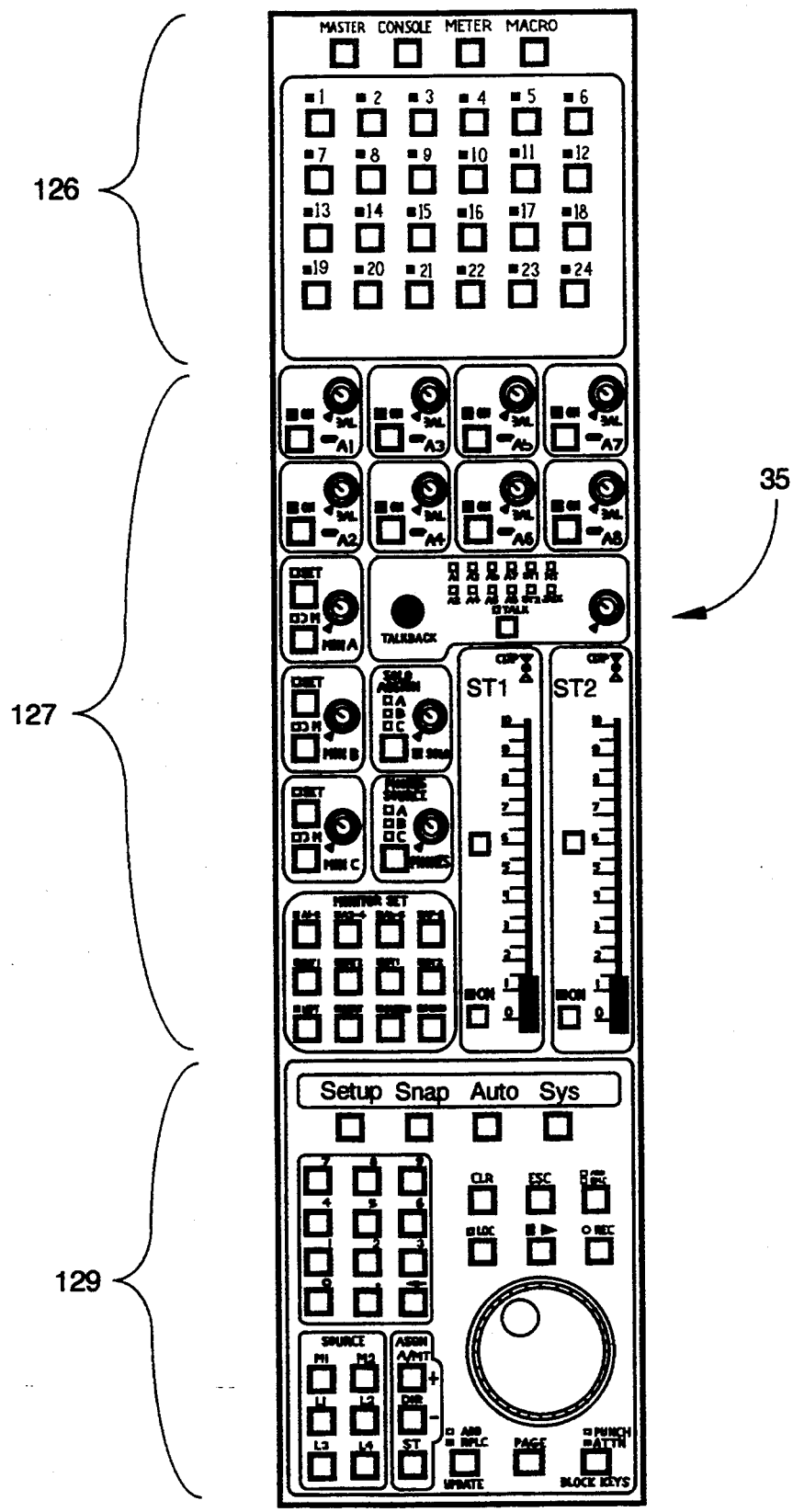
FIG. 5A is a plan view of a master module in the preferred embodiment.
Figure 5B:
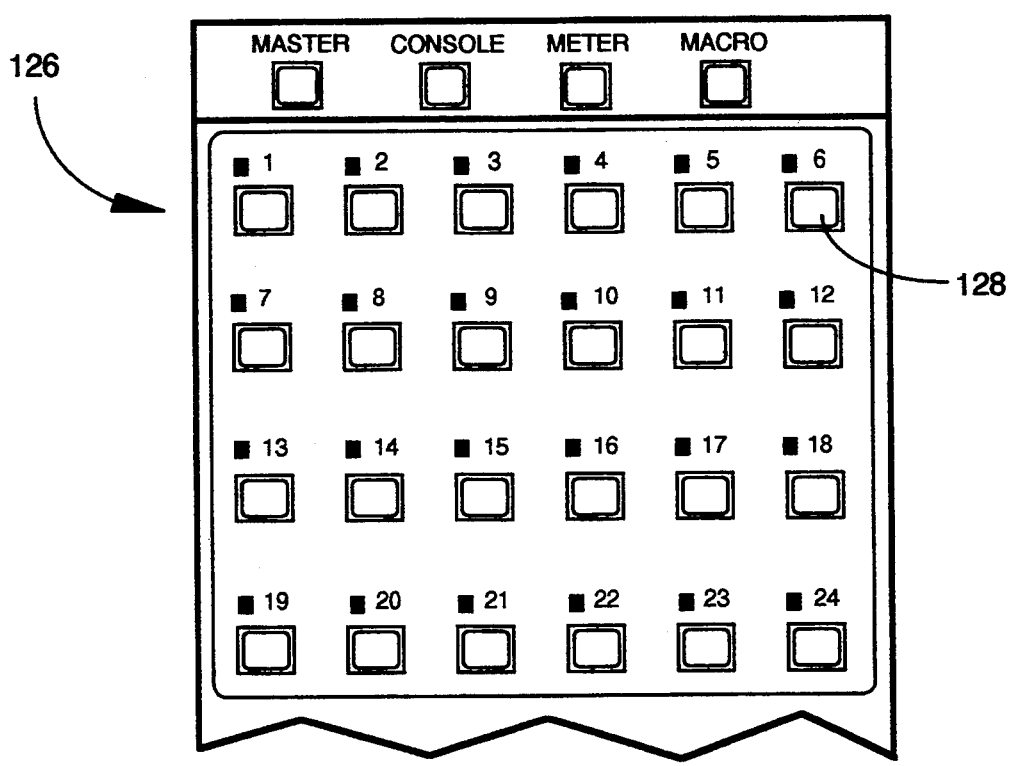
FIG. 5B is a view of just the Macro Section of the Master Module.

FIG. 5A illustrates Master Module 35. The Master Module comprises digital bar-graph meters, (not shown) Macro Section 126, Master Section 127, and Command Section 129. FIG. 5B shows the Macro Section 126 in more detail. The Macro Section has 24 Macro keys like key 128 for accomplishing procedures otherwise requiring several keystrokes in a single keystroke. The macro keys are configured by a procedure described below.

Figure 5C:
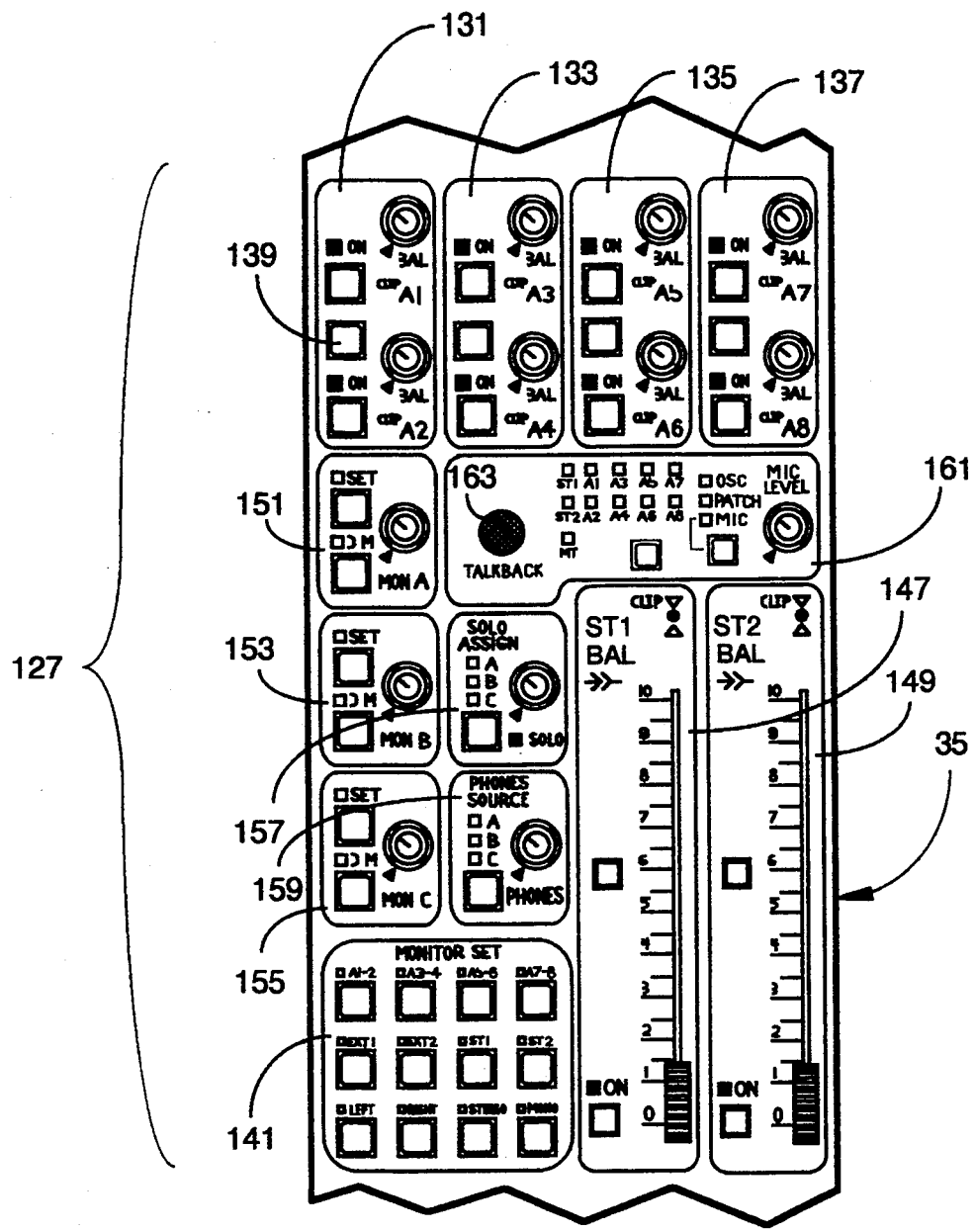
FIG. 5C is a view of just the Master Section of the Master Module.

FIG. 5C shows Master Section 127 in more detail, which includes several input blocks for signal control devices in the audio mainframe that have more general application than the devices associated with an I/O channel. There are four auxiliary bus master control blocks 131, 133, 135, and 137. Each block controls a pair of auxiliary buses that can be configured as mono individual buses or stereo pairs. The auxiliary buses are typically used for cue mixes or as group sends to mono or stereo signal processors. Each individual aux bus has a send level control pot and an on/off key with an indicator. Each pair has a block attention key, such as key 139 for pair 131.

There are two master faders 147 and 149 that control two main stereo mix buses in the audio mainframe.

The Master Section also has three monitor outputs 151, 153, and 155 that can be sourced from any of the mixing buses or from two external stereo inputs. A typical configuration consists of one control-room monitor and two studio cues. Monitor set block 141 is for configuring each of the monitors. To configure a monitor, the user presses the Set key at a monitor control block, then presses the appropriate keys in block 141. The setting keys can sum as well as select, so a single monitor output can be across several buses at once.

Control block 157 is for controlling a kill/solo bus, which can be directed to any or all of the monitor outputs. The activation of any pre-fader listen (PFL) or after-fader listen (AFL) on an I/O channel replaces the program on the monitor output with the channels chosen to solo. The monitor output returns to normal after the PFL or AFL is deactivated.

Control block 159 is for a headphone amplifier which can be selected to monitor any or all monitor outputs. Talkback control block 161 has a built-in talkback mike 163, which is switchable to an external mike (not shown), and a test tone oscillator that can be assigned to any of the mixer buses or to an output jack (patch) on the audio mainframe or the patchbay. There is a destination display, a block attention key, and an on/off toggle key for the talk back circuit.

Figure 5D:
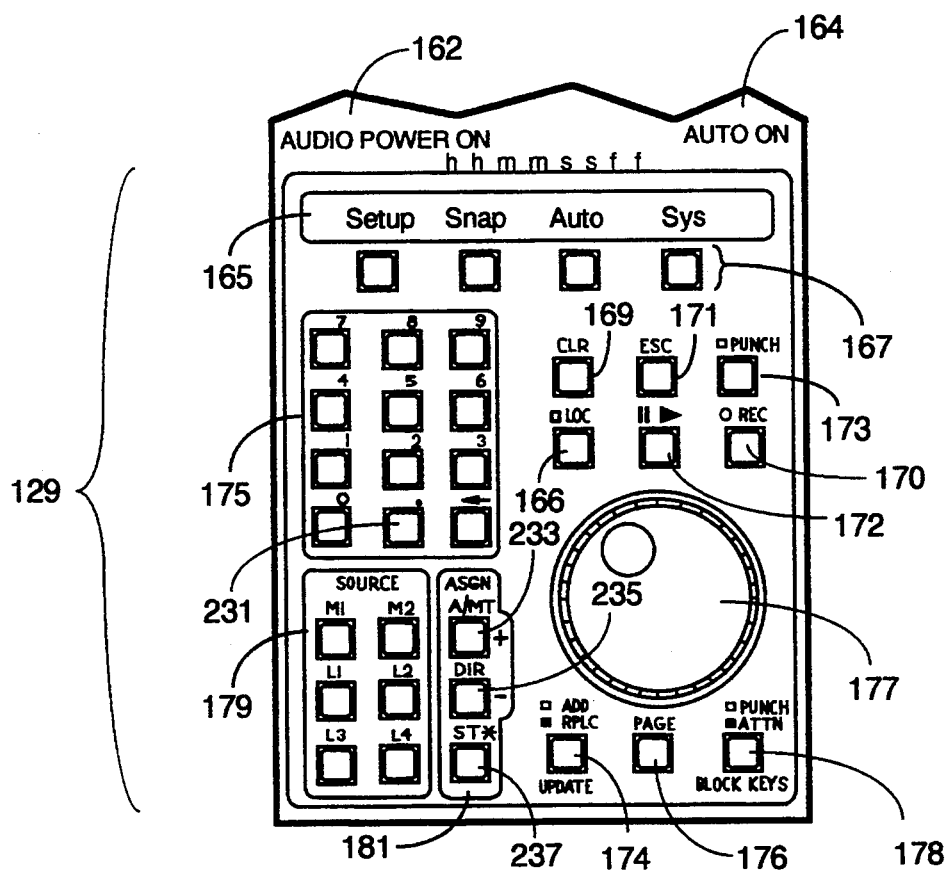
FIG. 5D is a view of just the Command Section of the Master Module.

FIG. 5D shows Command Section 129, which is a control interface for a user to make assignments and setup of the Crescendo's many input and output functions. The command section includes a multi-segment LED monitor 165 for presenting information back to a user and for associating with a set of four soft keys 167. There are dedicated keys for clear (169) and escape (171). There is a ten-key input pad 175 for numerical input and a data entry wheel 177 for indexing through pre-programmed variables to display for input. There is also a set of source attention keys (179) and a set of Assign keys (181).

Just above the data entry wheel 177 there are keys 173, 166, 172, and 170, which are associated with Automation functions. Keys 174, 176, and 178 below the data entry wheel are also associated with automation functions. Above monitor 165 a backlit display 162 indicates the power status of the Audio Mainframe, and another backlit display 164 indicates the on/off status of the Automation function.

The Master Module is cabled to the audio mainframe in the same way as the channel modules, with a high-speed serial communication cable assembly. The Master Module is removable and replaceable in the same manner as the other pod modules. There is (not shown) a serial connector for connecting the Master Module to PC 59 (FIG. 1). The communication mode with the PC is RS-232 in the preferred embodiment. The Crescendo system is fully operational without the PC and display monitor 23, but the PC sub-system adds extra control dimensions for the system in alternative embodiments.

Figure 6:
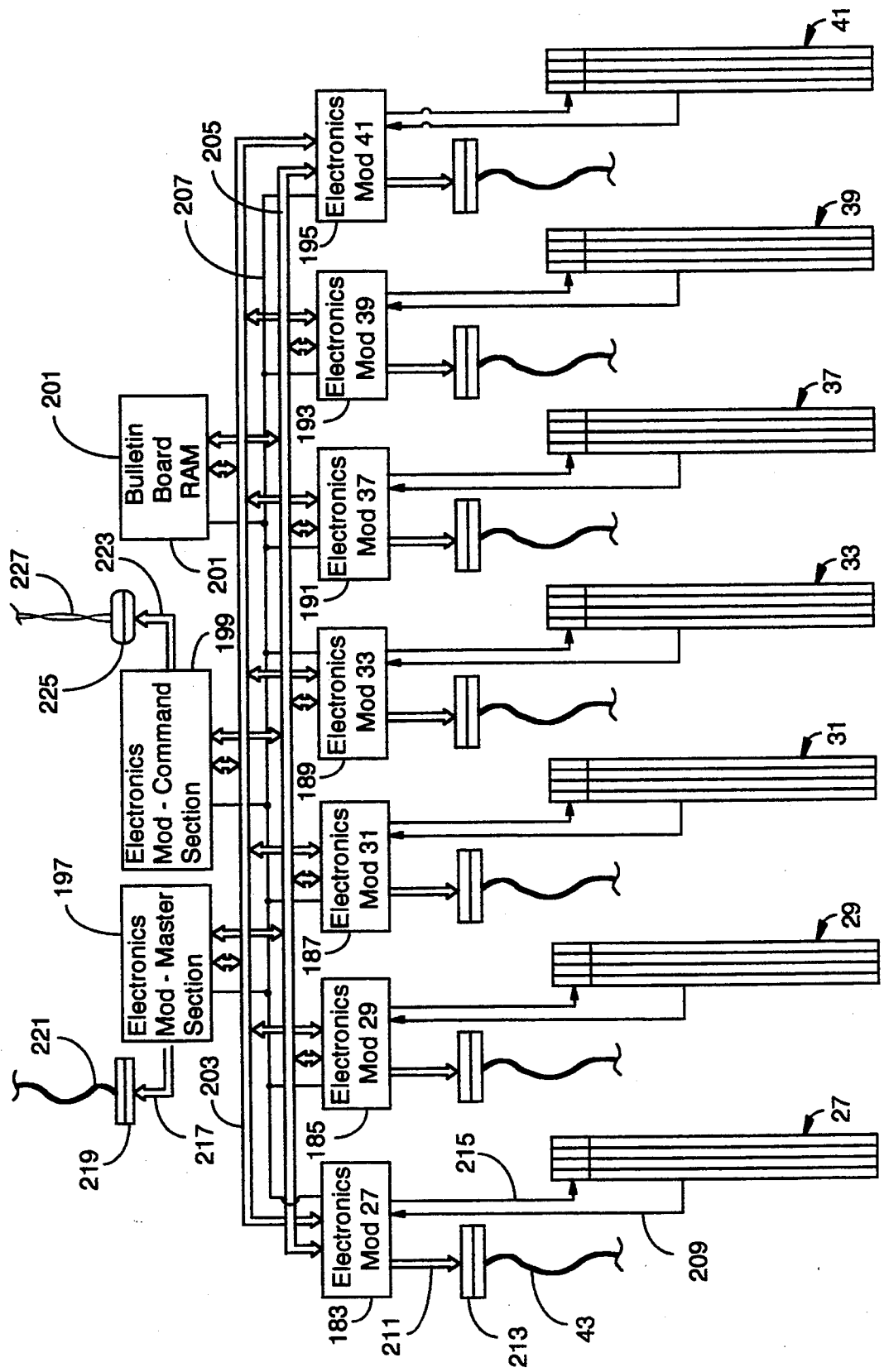
FIG. 6 is a block diagram of the control architecture of the system in the preferred embodiment.

FIG. 6 is a block diagram of elements of the Crescendo control system. Each I/O pod module, comprising four channels, has an electronics module including a Zilog Z80 microprocessor, Ram memory that can be expanded, and a small ROM. The electronics modules for each pod module are modules 183, 185, 187, 189, 191, 193, and 195; associated with pod modules 27, 29, 31, 33, 37, 39, and 41 respectively. Each electronics module also has RAM and ROM memory. Electronics module 197 is in the Master section of the Master Module, and also includes a Z-80 microprocessor, RAM, and ROM. Electronics module 199 serves the Command Section, and also includes a Z-80 microprocessor, RAM, and ROM. There is an additional Bulletin-Board RAM 201 in the Master Module, accessible to all the microprocessors, for usually temporary storage of commands, configurations, and other data. The microprocessors communicate on internal 8-bit data bus 203 and 16-bit address bus 205. There are also power and control signal connections between the microprocessors, the memories, and other elements, as known in the art, represented by lines 207.

Figure 9:
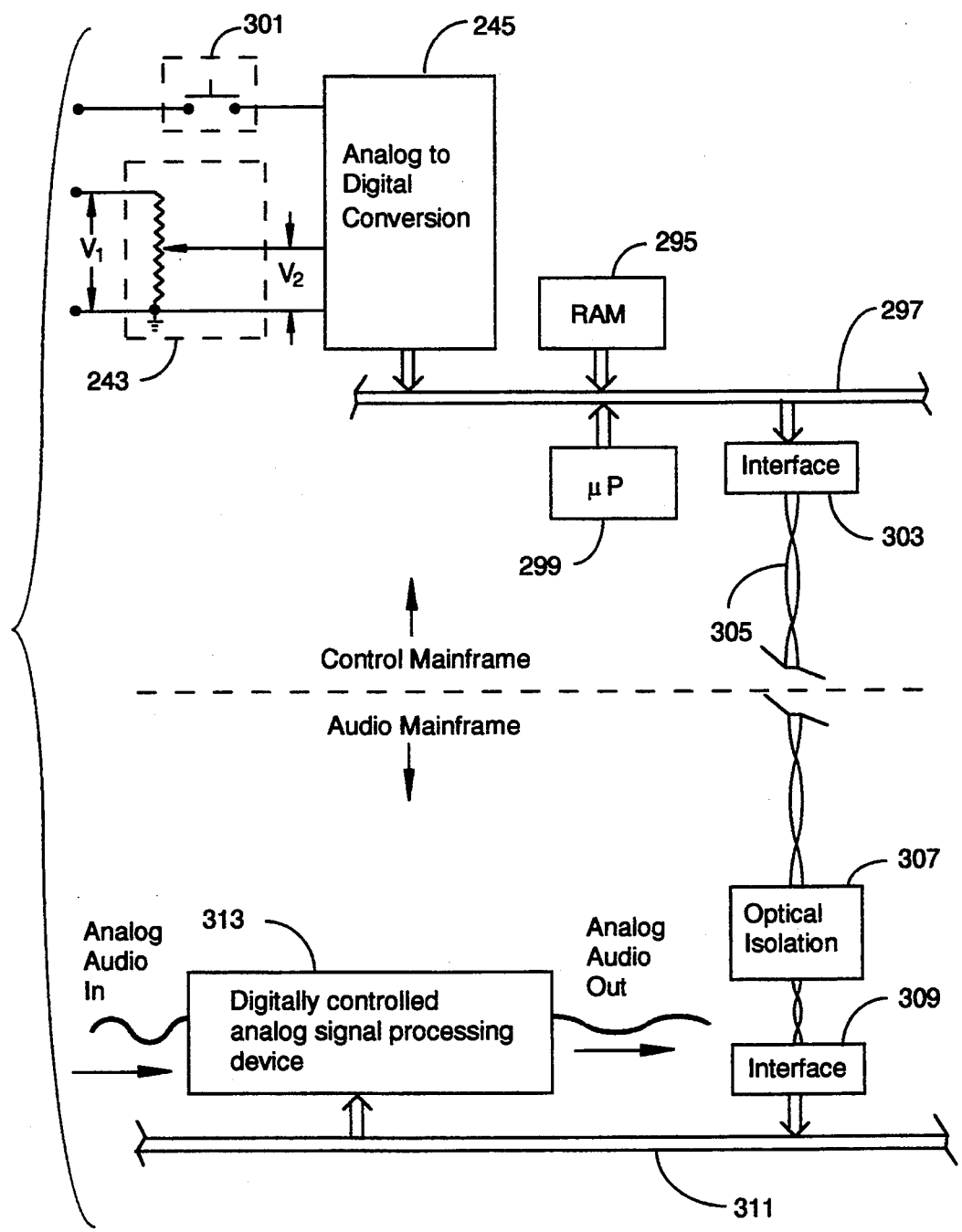
FIG. 9 is a schematic diagram of control signal routing from input devices to controlled audio processing devices.

FIG. 9 shows a typical arrangement for an input device 243, such as a trim pot or a fader at an input block. The variable level input devices are generically variable resistors with a DC input supply V1 of typically about 2.5 volts. The reference voltage V2 is conveyed to the appropriate electronics module (see FIG. 6) where it is processed through an analog to digital converter 245, and the digital data representing the setting of the input device is stored at an appropriate assigned addresses in RAM 295 via a bus structure 297 internal to the pod containing the channel supporting the input device. Input devices that are keys (buttons) are represented by contact closure 301 providing a momentary signal at the DC voltage which is converted to a digital equivalent by the analog to-digital function and stored at an appropriate assigned address in RAM. It is the storage of data representing input settings that provides maximum flexibility and software-based control for the mix controller.

Storage, retrieval, and output of data is controlled by microprocessor 299 in the representative schematic of FIG. 9. Each I/O pod has such a microprocessor and RAM. The microprocessor also controls transmission of digital data, via a communications interface 303 and a cable connection 305 for each pod, to the audio mainframe, where an optical isolator 307 and another communications interface 309 provide for putting the data on a control bus 311 where individual digitally controlled, addressable, analog audio signal processors represented by processor 313 access the data to control the audio signals to be processed and mixed.

There are several different kinds of digitally controlled analog audio processors represented by processor 313. Some are essentially "switches" with more than one input and output that can be controlled to sum two or more signals. These are used in routing assignments for inputs and output buses. Others are such as programmable parametric equalizers, amplifiers, and faders, that alter the audio signals routed to them according to the digital commands they receive.

Returning now to FIG. 6, electronics module 197 serving the Master Section outputs data on a bus 217 to connector 219 which connects to cable 221 to the audio mainframe. Electronics module 199 associated with the Command Section outputs data on a bus 223 to a connector 225 connected to RS-232 link 227 to PC 59 shown in FIG. 1.

Menu System

System control is accomplished by the user at the various control blocks, at the Command Section of the Master Module and through control screens on monitor 23. Input devices at the command section were described briefly above.

In the Crescendo system, virtually every input can be assigned to virtually every output, and there is complete flexibility in mixing signals. There are, as described above, 2 mike and 4 line inputs (sources) for every I/O channel. The total number of inputs is flexible, as there is flexibility in the number of I/O modules, each with four I/O channels, that may be provided with a system. In the embodiment described herein there are seven modules, hence twenty-eight I/O channels, hence 56 mike inputs and 112 line inputs, routable through the fifty-six faders, with two faders per I/O channel. Any fader can be mono or stereo, or receive up to four line and two microphone inputs simultaneously.

There are two user interfaces for control set-up and signal routing, the PC screen and the Command Section of the Master Module. The input and readout devices referred to in the present description of command procedures at the command Section are relative to FIG. 5D, as described above.

User input at the Command Section is via a hierarchical menu system displayed on monitor 165. The routines for the display are stored in memory, and retrieved and displayed in response to user signals. In the preferred embodiment the essential routines are in ROM memory associated with microprocessor 223 in the Command Section. When the Crescendo system is first powered up, essential routines are copied from ROM to RAM associated with each of the microprocessors in the control system.

Figure 7A:
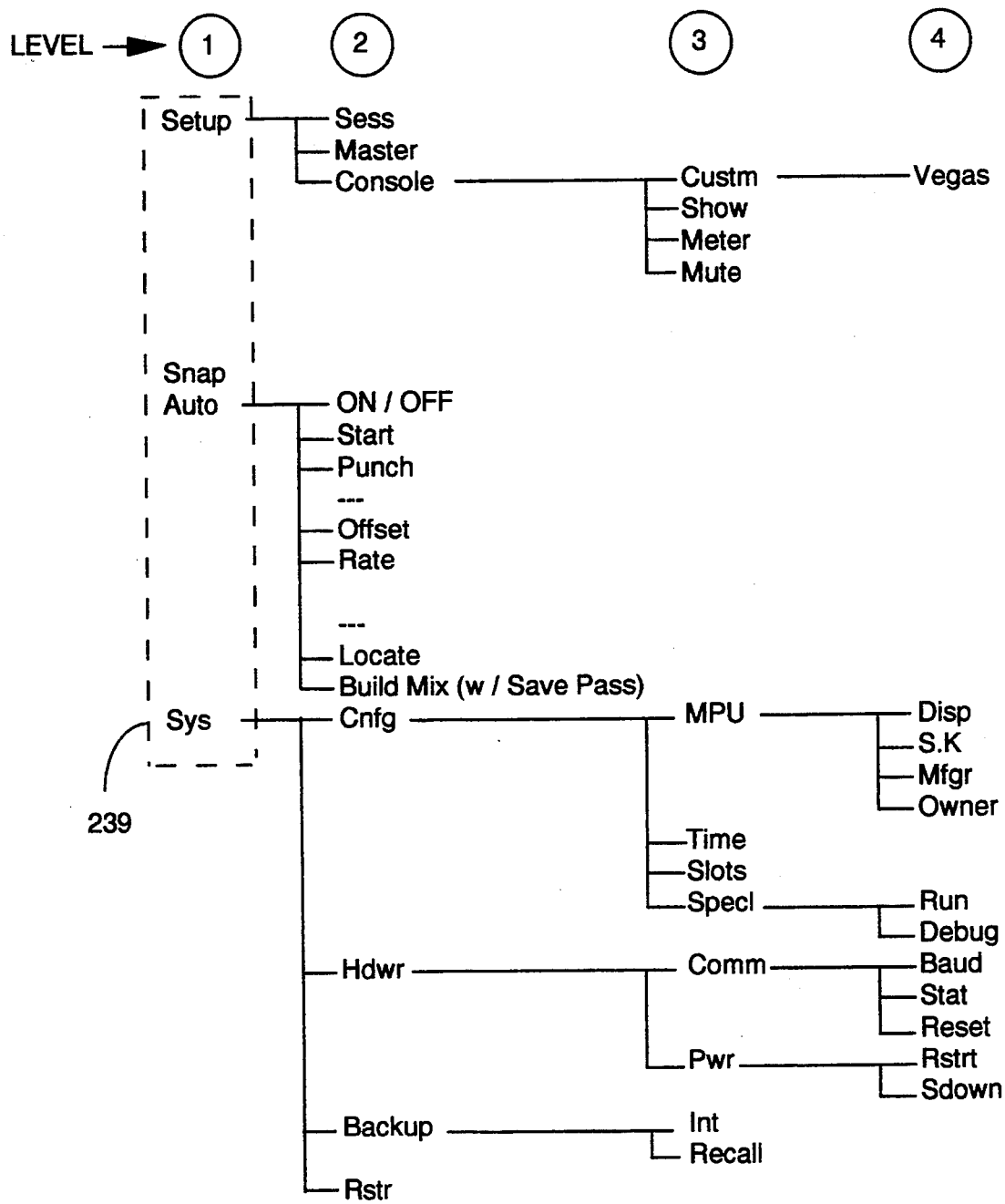
FIG. 7A is a partial diagram of a hierarchical menu organization for the control system.

FIG. 7A shows the four level menu system in the preferred embodiment. The top level (Level 1) menu has four selections: Setup, Snap, Auto, and System, shown within a dotted enclosure 239. This top-level menu is shown displayed on monitor 165 (FIG. 5D), and each selection is aligned with one of the soft keys 167. By pressing a soft key directly below a menu selection, the user accesses another menu, if a lower level menu is available. Otherwise control procedures are enabled through the menu displayed.

For example, following the hierarchy shown in FIG. 7A, a user can press the soft key below Setup in the top level menu, and monitor 165 will display the second level menu with Sess (for session), Master, and Console as selections. By pressing the softkey under Console in the second level menu, the user accesses a new menu with Custom, Show, Meter, and Mute as selections.

At the end of each downward path there is a control function. For example, one may select Sys (for System) from the top level menu, then Hdwr (for Hardware), then Pwr (for Power), and arrive at a menu with two selections, Rstrt (for Restart) and Sdown (for Shutdown). In this case, pressing the softkey under Rstrt causes the system power to disengage, then restart in a programmed manner to bring up all powered equipment in an orderly and safe sequence according to system defaults, and properly initialize all powered equipment. Similarly, the key under Sdown will cause the system to shut down all power in an orderly fashion without danger of damage to components or loss of important settings or data. In some other cases the final menu function will prompt the user for some input at the ten-key numerical input pad.

Console Initiated Menu Control

Figure 7B:
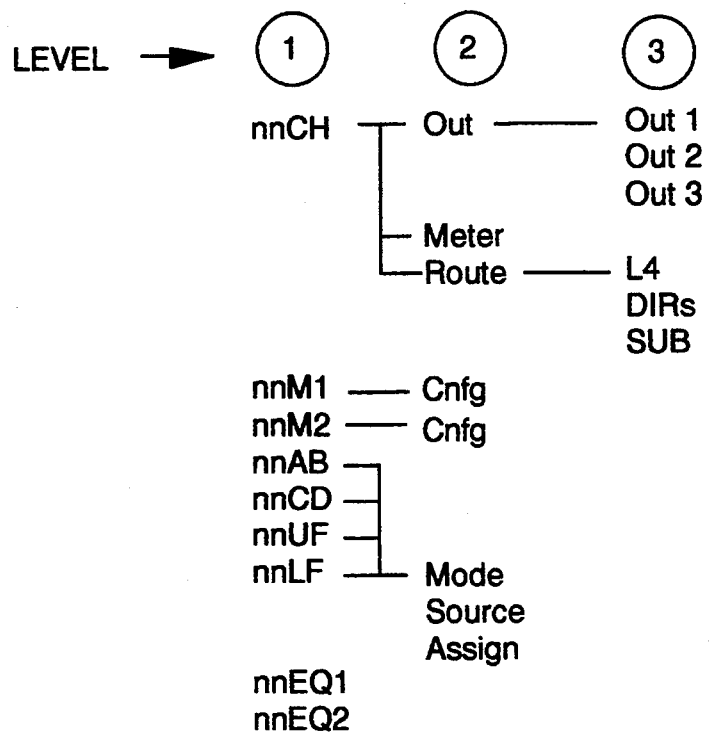
FIG. 7B is a diagram showing additional menus.

Unique to the present invention is a setup procedure initiated from the control blocks and used in combination with the menu system to set up routing of audio through the signal processing devices in the Audio Mainframe, relative to the control blocks on the control console face, and in some cases other functions. This procedure begins with a block attention key as described above. FIG. 7B shows a menu system initiated by block attention keys at control blocks in I/O channels on the Crescendo console. The "nn" preceding each designation at the top (1) level represents a Channel number on the console face.

In FIG. 7B there are top level entry points for each attention key in a channel strip. As an example, UF is for upper fader, and LF is for lower fader. A simple example will serve to illustrate the utility and value of the procedure.

Figure 8A:
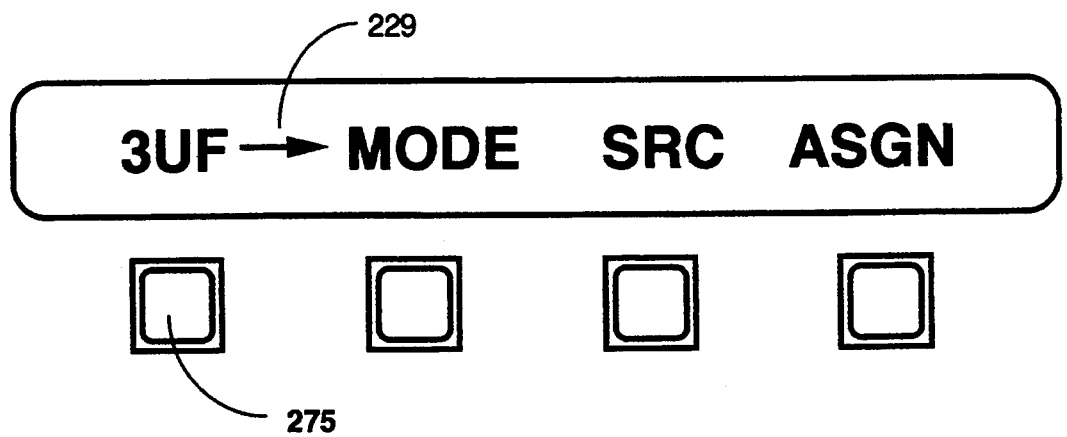
FIG. 8A shows a display of a menu accessed from a block attention key.

If the user presses the block attention key for the upper fader in Channel 3, which is key 111 in FIG. 3E, the system displays in response the menu shown in FIG. 8A. 3UF on the display refers to the upper fader (UF) for I/O channel 3. Channel 3 is used arbitrarily, and the number will reflect which block attention key is pressed. Arrow symbol 229 denotes the attention function is active.

Figure 8B:
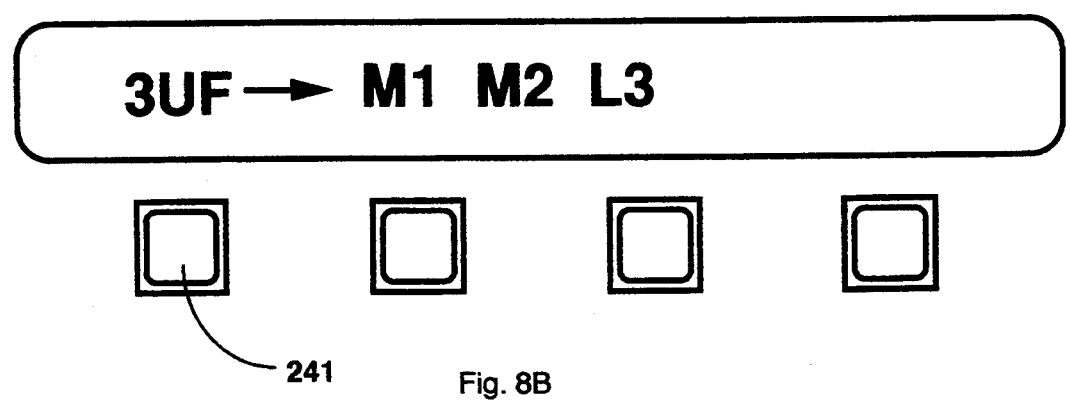
FIG. 8B shows a display after assigning inputs to a fader in a channel on the console.

The rest of display reads MODE, SRC (for source), and ASGN (for assign). This menu is indicated in the menu hierarchy shown by FIG. 7B. Each of these labels represents a function, and a particular function may be accessed by pressing the softkey directly below the label. For example, to direct inputs (sources) to channel 3 upper fader, one would press the SRC key. Sources are then selected by pressing buttons in Source Input Block 179. Any combination or all of the two mike sources and four line sources may be selected. In this example sources M1, M2 and L3 are selected, and the selections are then displayed on LCD display 165 as shown in FIG. 8B. The operator enters the selections and completes the process by pressing decimal button 231 (FIG. 5), which enters the selection and completes the function.

When the input selections are made as described above, the selections are displayed on the panel face by backlighting the appropriate display numbers in source block 107 in the control block for the upper fader in channel 3 (FIG. 3E). The designations M1, M2, and L3 "light up" in block 107 at the location of the upper fader on the console. Input assignments for all other components with controls available on the I/O console are re&de in substantially the same manner, by pressing the appropriate block attention key, selecting SRC in the LCD display, and entering the input or inputs from block 179 to be associated with the selected component.

Output routing is done in a manner similar to the procedure for input routing. One calls attention to a component as before, by pressing a block attention key, then presses the softkey labeled ASGN. Output associations are then selected at ASGN block 181 (FIG. 5D). Button 233, labeled A/MT, denotes auxiliary buses, of which eight are available, or multi-track output, which may vary in number depending on the multi-track tape deck employed. So, to route a component output to one of the eight auxiliary buses, one presses the A/MT key, then a number in the numerical input block 175. Button 235 denotes association to a direct (dir) output bus, of which there are two, usually switched on and off together. Again, the number is entered at numerical key pad 175.

ST key 237 denotes a stereo bus, of which there are two, and the number one or two is entered as before at the numerical keypad followed by the enter key. A user can assign any component output to any one of the buses, or to any combination. After selecting output assignments the assignments are highlighted in the display at No. 3 upper fader control block.

There are functions other than routing of audio signals that can be set via block attention initiated menus. A good example is the setting of fader modes. When the user presses a block attention key for a fader, such as number 3 upper fader, the menu reflects the initiation as shown in FIG. 8A, which was used to describe routing procedures. To set a mode, which determines how the fader controls the input signal, the user presses the Mode softkey, and the system displays any of twelve programmed fader modes. The modes include Disabled, mono modes, and stereo modes. As an example, one of the modes is Mono Pan Center, in which all inputs to the fader are summed to mono, and the signal is automatically panned center and is not adjustable. A worker with skill in the art will recognize that there are a broad variety of useful modes that may be programmed and assigned. To enter a mode after the mode is displayed, the user presses the soft key under the mode name in the display.

Auxiliary sends are programmable with modes in the same fashion as faders, but there are several more modes for the sends, these being post fader modes.

The block attention procedure provides the user with a direct and physical location fix when assigning inputs, outputs, and modes, and displaying modes and routings at the control block after the associations are set at the Command Section provides an always active association at the block, so it is seldom necessary to "call up" a display to recheck.

Figure 7C:
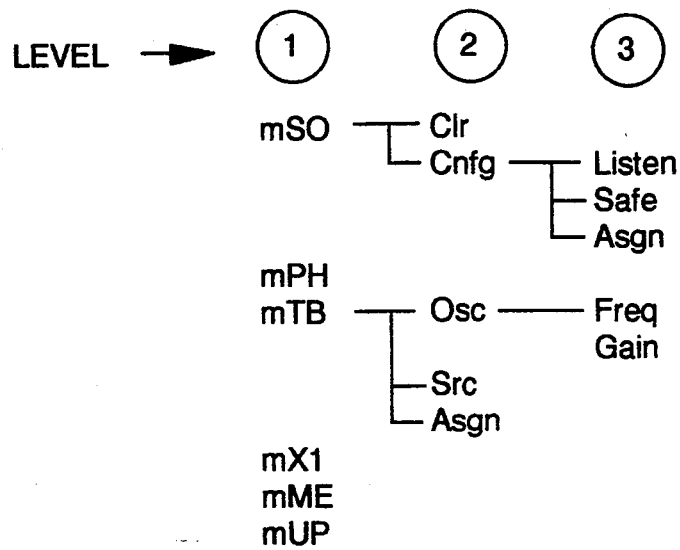
FIG. 7C is a diagram showing yet additional menus.

FIG. 7C shows the hierarchical menu tree for the Master Section, providing block attention initiated configuration procedure from the Master Section in the same way as for the channel routing procedure described above.

Block Copy

Another unique ability provided by the invention is called Block Copy. By Block Copy one can configure one control block, routing sources to and assigning outputs from, and then Block Copy the configuration to any other control block on the console (capable of having the same routing assignments) by a simple and direct procedure. As an example, if one makes the assignments to channel number 3 upper fader as in FIG. 8A, the system displays the assignments as shown in FIG. 8B. Then the user can press soft key 241 enabling the Block Copy function. Pressing the block attention key at any other blocks capable of accepting the assignments of channel number 3 upper fader then copies the routing configuration to the block where the attention key is pressed.

With Block Copy a user can set up routing for the upper fader of channel number 1, for example, and then copy that routing across all the channels simply by pressing the block attention keys for the upper faders one after another.

Figure 10A:
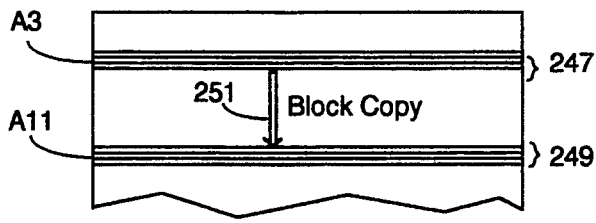
FIG. 10A shows a block copy function relative to RAM memory space.

The Block Copy mechanics are shown by FIG. 10A. Every routing for a block is stored in a particular addressed space in RAM. For example, routing for number 3 upper fader may be stored in memory space 247 beginning at address A3, and routing for number 11 upper fader in space 249 beginning at address A11. A simple routing may be stored in a single address word, and a more complicated routing may take more than one address word.

Figure 10B:
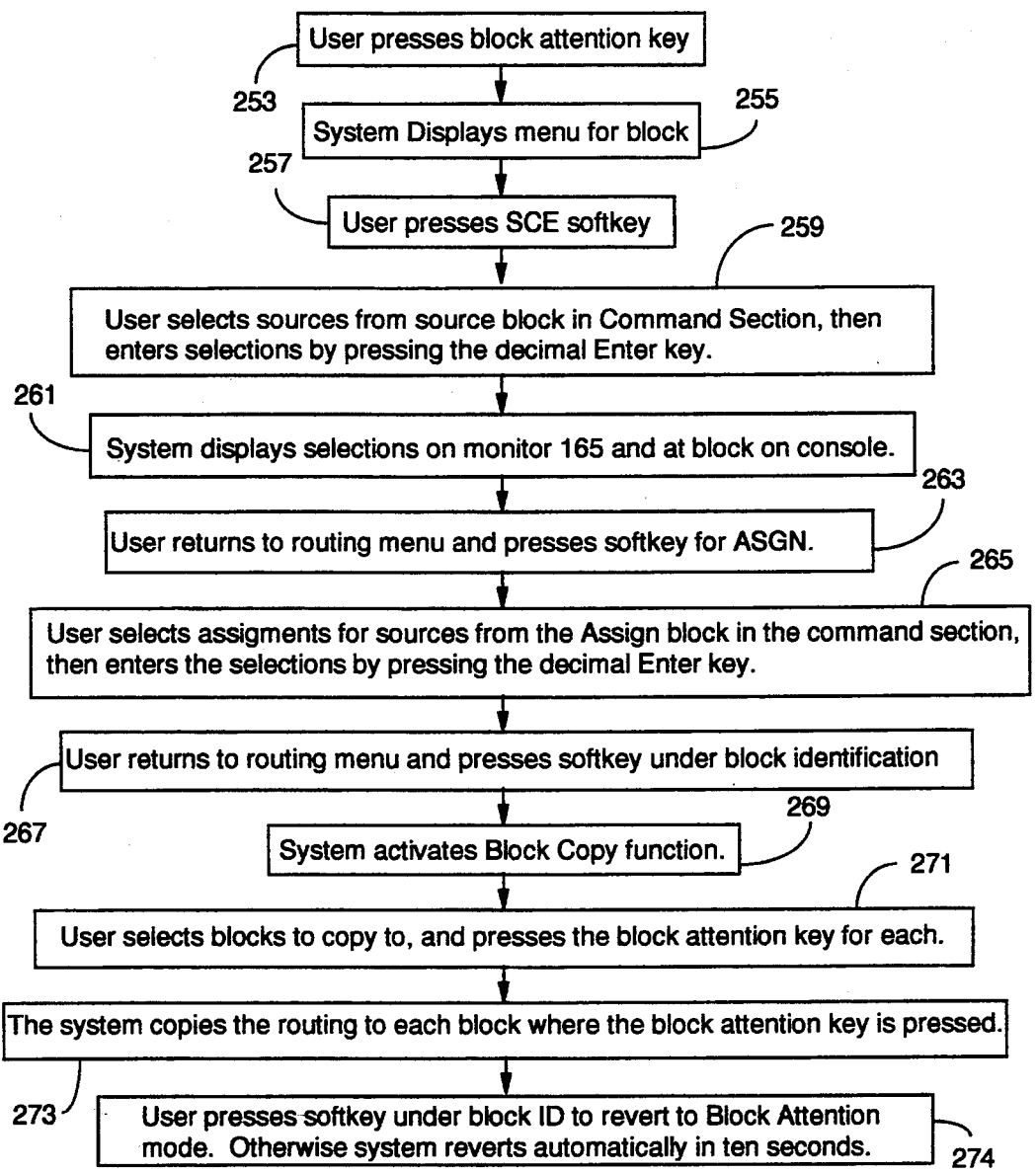
FIG. 10B is a flow diagram of the process of setting up and copying a block.

FIG. 10B shows the routing and Block Copy procedure represented by a stepwise flow diagram for setting up a routing for a block and copying the routing to other blocks. The flow diagram is a specific example of the procedure as provided for setting up routing for any block and copying from any one block to another.

At step 253 the user presses the block attention key for a block, and the system responds at step 255 by displaying the routing menu for the block. At step 257 the user presses the softkey under SRC (for Source). At step 259 the user selects sources (inputs) from the Source Block in the Command Section and enters the selections by the decimal Enter key. At step 261 the system displays the selections both on the monitor and at the particular block. At step 263 the user returns to the routing menu and presses the softkey for ASGN. At step 265 the user selects output assignments and enters the selections. At step 267 the user returns to the routing menu and presses the softkey under the block identification in the menu. For the menu shown in FIG. 8A, this is key 275. In response, at step 269, the system activates the Block Copy function. At step 271 the user selects blocks to copy to, and presses the block attention key for each. At step 273 the system copies the routing to each block where the attention key is pressed. The copies are made and routings displayed at the block as each block attention key is pressed. The system makes a copy of the data in the memory section for the original block (being copied) and places a copy in the memory section for each block copied to, overwriting the data in the block copied to. This process is represented by arrow 251 in FIG. 10A. At step 274 the user presses the softkey under the block ID in the menu to signal the system to revert to the Block Attention mode. If the user does not initiate the reversion, the system automatically reverts in ten seconds.

Snapshots

The Snap selection from the top level menu enables a Snapshot function unique to the present invention. With Snapshot, a user can store all the immediate settings of the console for later recall. Snapshot provides a way to store favorite configurations to be used in similar situations, or even to store on a floppy disk and use the data to set up another Crescendo system at another location. In the preferred embodiment up to 99 user-definable Snapshots are stored at preselected memory spaces in RAM 201.

To access the Snapshot function the user presses the softkey under Snap from the top level menu shown in the Command Section display in FIG. 5D. The system responds by displaying the menu shown in FIG. 11A. The designations 279 at the left of the menu including "SS" simply indicate that this is the Snapshot menu. Designation 281 "RCL" indicates the Snapshot function is in the Recall mode, allowing a user to select a stored configuration and copy it to the console. The Recall mode is the default when the Snapshot function is initiated, to avoid storing unwanted configurations, which might overwrite other information in memory.

Figure 11A:
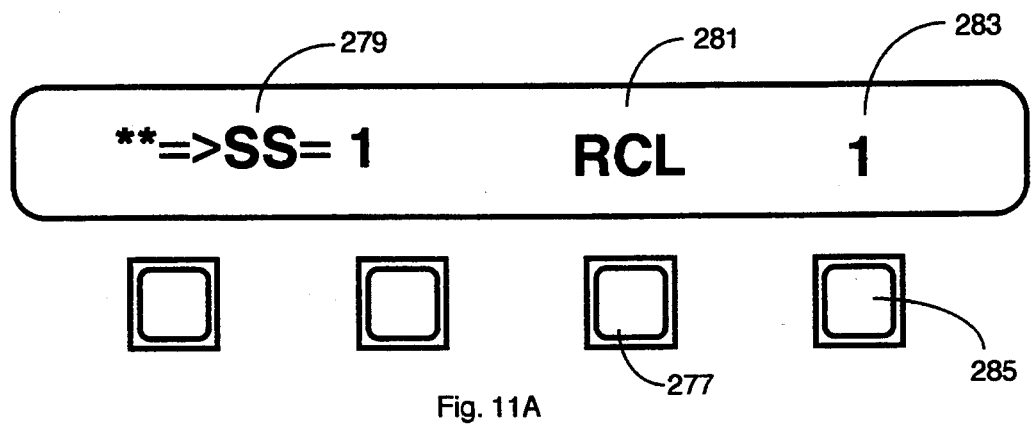
FIG. 11A shows a menu for recalling a snapshot.
Figure 11B:
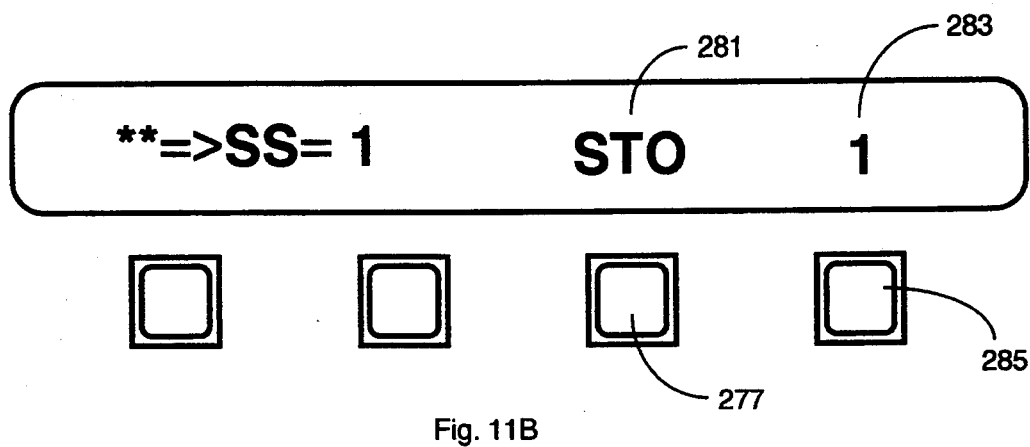
FIG. 11B shows a menu for storing a snapshot.

To put the system in the Store mode the user must press softkey 277 to toggle the display from that shown in FIG. 11A to the display shown in FIG. 11B. The system always reverts to the Recall mode after a Snapshot is stored. In FIG. 11B designation 281 says "STO" for Store, and indicates the Snapshot function is in the Store mode.

To store a Snapshot, that is, data indicating all of the immediate settings and routing assignments of the console, which is the entire console configuration, the user, with Snapshot in the Store mode, selects a Snapshot number (283) from 1 to 99. The numbers can be changed by entry on the numeric keypad at the Command Section, or by rotating data entry wheel 177. When the desired number is displayed, the user presses softkey 285 under the number display, and the system stores the configuration in the memory space reserved for that number. If another configuration is already stored at that memory space, the old data is erased and the new inserted.

To recall a stored configuration it is helpful to be able to browse through stored data. To do this, with Snapshot in the RCL mode, the user can scroll through the stored snapshots, recalling them one by one. Pressing the "+" key in the ASGN block at the command section scrolls forward, and pressing the "−" key scrolls backward. The Snapshot numbers are displayed in the menu display and the configuration is shown by lighting the LEDs at all of the blocks on the console.

Snapshots may also be stored to the floppy disk associated with the attached PC, and transferred between the floppy disk and RAM 201, using simple command techniques initiated at the PC or at the Command Section.

When a Snapshot is recalled, configuring the Crescendo console to a stored configuration, some of the physical settings of input devices in the blocks may not be the same as the values being communicated to the mainframe by the software in behalf of that particular block. For example, a physical fader position might well be completely off (in the lowermost position) while the software is communicating data indicating a much higher setting.

At a fader, when the physical position is not the same as the communicated value, there is a group of LED indicators 287, 288, and 289 (FIG. 3E) that indicate the situation. If the green LED 288 is lit, the physical position and the "software" position are the same, although the software position and the physical position are not linked. If the green LED is not lit, and it would be required to move the fader "up" to align it to the software position, "up" arrow 287 will be lit. If it is necessary to move the fader "down" to align, "down" arrow 289 will be lit. A user can simply move the fader in the right direction until the green LED is lit, indicating alignment and agreement. If none of the LEDs is lit, the software and physical positions are in agreement, and the two are linked, meaning if the user moves the physical position the software position will follow. To link the positions when they are not linked, it is necessary to press the block attention key.

For a rotary knob, such as knob 291 in FIG. 3E which activates a rotary potentiometer (pot), there is an LED indicator 293. If the LED is red, the physical setting and the software setting do not agree. If the LED is green the settings agree. There is no direction indication.

In addition to user-definable Snapshots and default Snapshots a user can access, there is an automatic backup function based on Snapshots. Through this facility the system creates a backup of the entire console configuration with a user-definable frequency, ranging from once per minute to once every 99 minutes. Every time the system stores a backup Snapshot, it replaces the previous backup snapshot. This way, in the event of a power failure or some other disaster that results in "losing the board", the user can recall the backup and restore the configuration as it was at a recent moment. To set up the backup parameters, such as the time frequency, the user accesses the Backup menu below the Sys selection in the top level menu.

Automation

Block Copy and Snapshot are static functions for copying data as it exists at an instant in time. The Crescendo also includes automatic functionality which is dynamic in nature. You can record dynamic sequences comprising changes in routing and changes in settings of signal processing equipment, and synchronize the recorded sequences to incoming SMPTE time code. SMPTE stands for the Society of Motion Picture and Television Engineers. In playback mode, the Crescendo will make the recorded changes automatically at specific times.

The physical controls, such as fader positions, do not change during playback, but the software changes the actual settings, which includes the data sent to the audio mainframe. The indications at the specific blocks as to whether the physical settings differ or are the same as the software driven settings, is the same as described above for the Snapshot function.

The Automation function is accessed by pressing the softkey under Auto in the top level menu. The top level menu has those selections in box 239 of FIG. 7A. The lower level selections under the Auto selection can be seen in the diagram as ON/OFF, Start, Punch, Offset, Rate, Locate, and Build Mix.

Macro Keys

There are 24 Macro keys in a block 126 at the top of the Master Section, with four attention keys above labeled Master, Console, Meter, and Macro. The four attention keys are for "calling attention" to blocks or functions not accessed by specific block attention keys on the console. Macro calls attention to Macro block 126 in the Master Module, and enables set up of Macro sequences. To record a sequence, a user presses the Macro attention key, then a specific macro key 1 through 24. Then the sequence of operations, such as key strokes, that the user makes until the Macro attention key is pressed again is recorded in a memory space reserved for that Macro key number, up to the memory capacity available for that Macro key.

To recall a macro sequence, the user only need press the Macro key during any other operation, and the recorded Macro sequence is entered.

It will be apparent to one with skill in the art that there are a number of equivalent ways that the system of the invention might be implemented without departing from the spirit and scope of the invention. There are, for example, several different microprocessors that might be used rather than the Z80 microprocessors in the preferred embodiment. Similarly, there are many alternative ways that input devices might be arranged on the control surface, and channels might be organized in removable pods in groups other than groups of four channels. Also, There are many commercially available switches, slide faders, meters, and so forth, that fulfill the requirements for the invention. There are similarly many other changes and alterations that might be made without departing from the spirit and scope of the invention.

What is claimed is:

1. A mix controller comprising:
   an audio mainframe for housing audio processing equipment;
   audio processing devices mounted in the audio mainframe and responsive to digital control data for processing audio signals by analog techniques;
   a console having manually operable input devices for inputting control signals and lightable elements for displaying control status and characteristics, including signal routing grouped in control blocks on an upper surface thereof, each control block corresponding to one of the audio processing devices mounted in the audio mainframe;
   a microprocessor-based control system comprising plural microprocessors and plural random access memory (RAM) units coupled to the console for receiving the control signals, converting the control signals to the digital control data, storing and retrieving the digital control data, and for controlling digital data transfer between the console and the audio mainframe; and
   a data communication link connecting the audio mainframe and the console for carrying the digital control data between the audio mainframe and the console;
   wherein the control blocks are arranged in individual input/output channel arrays, and at least one of the input/output channel arrays forms a removable pod module having one of the plural microprocessors and one of the RAM units, the removable pod module connected to the console by a first digital data link with a first separable connector.

2. A mix controller as in claim 1 wherein the console further comprises a master pod module, the master pod module comprising a master section with individual ones of the control blocks for supplying the control signals for audio processing devices not controlled by control blocks at input/output channel arrays, and a command section having input devices for providing control commands and a display for displaying menus, commands, and control data, the master section having at least one of the microprocessors and at least one of the RAM memory units, the command section also having at least one of the microprocessors and at least one of the RAM units, the master pod module connected to the console means by a second digital data link with a second separable connector, such that the master pod module is removable from the console.

3. A mix controller as in claim 2 wherein individual ones of the control blocks comprise a block attention key for enabling the block for one or both of set up of a signal routing and assignment of prestored control modes by commands input at the command section.

4. A mix controller as in claim 1 wherein the input/output channel arrays comprise at least one digitally controlled bar graph meter for displaying data.

5. A mix controller as in claim 1 wherein the data communication link comprises a plurality of digital communication cables, and the control blocks arrayed on the pod module communicate with an audio electronic module having one of the audio processing devices for each of the control blocks, and the audio electronic module and the pod module are connected by and communicate over one of the plurality of digital communication cables.

6. An audio mix controller comprising:
an audio mainframe housing digitally-controllable analog audio processing devices;
a console connected to the audio mainframe by a data communication link, the console having pod bays with separable connectors for receiving removable pod modules;
individual pod modules configured for docking in the pod bays, individual ones of the pod modules comprising manually-operable input devices for inputting control signals and lightable elements for displaying control status and characteristics, including signal routing, the manually-operable input devices and lightable elements grouped in control blocks on an upper surface thereof, each control block corresponding to an audio processing device in the audio mainframe; and
a microprocessor-based control system comprising a microprocessor and a random access memory (RAM) unit in each pod module.

7. An audio mixer as in claim 6 wherein individual ones of the removable pod modules are input/output channel arrays and at least one of the removable pod modules is a master pod module configured for controlling functions not provided by the individual channel arrays, including configuration, routing, and automation.

8. An audio maxer as in claim 7 wherein the master module is configured to connect to and communicate with a personal computer (PC).

9. An audio mixer as in claim 6 wherein the data communication link comprises individual data communication cables, each individual cable connecting one removable pod module with circuitry in the audio mainframe.

10. An audio mixer as in claim 9 wherein the circuitry in the audio mainframe is organized in individual removable and replacable audio processing modules, each audio processing module corresponding to and connectable to an individual removable pod module.

11. An audio mixer as in claim 9 wherein each individual cable is optically isolated at one end.

* * * * *

UNITED STATES PATENT AND TRADEMARK OFFICE
CERTIFICATE OF CORRECTION

PATENT NO. : 5,402,501
DATED : March 28, 1995
INVENTOR(S) : Silfvast et al.

It is certified that error appears in the above-identified patent and that said Letters Patent is hereby corrected as shown below:

<u>Title page,</u>
Item [75], Inventors, "Scott W. Silfvajt" should read -- Scott W. Silfvast --; and "Andrew E. Kalmau" should read -- Andrew E. Kalman --.

Signed and Sealed this

Twenty-seventh Day of December, 2005

JON W. DUDAS
*Director of the United States Patent and Trademark Office*